Sept. 17, 1963     J. J. FULTON ETAL     3,103,891
UNLOADING RELIEF VALVE
Filed Oct. 1, 1959     2 Sheets-Sheet 2

Inventors
John J. Fulton
John R. Albright
By McCanna, Morsbach & Pillote
Atty's 3,103,891
UNLOADING RELIEF VALVE
John J. Fulton, Rockford, Ill., and John R. Albright, Athens, Ga., assignors to Roper Hydraulics, Inc., Rockford, Ill., a corporation of Illinois
Filed Oct. 1, 1959, Ser. No. 843,842
9 Claims. (Cl. 103—42)

This invention relates to a pumping system and particularly to a pumping system having an improved arrangement for unloading the pump upon termination of delivery of liquid from the system.

An important object of this invention is to provide a pumping system for use in fuel delivery trucks, fire trucks and the like, and which will deliver the liquid to the hose at a relatively high pressure when the hose nozzle is open to thereby provide rapid flow to the hose, which automatically reduces the pressure in the delivery hose correlative to the rate of flow therethrough when the nozzle is throttled, and which automatically reduces the pressure in the delivery hose to a low value when the flow therethrough is cut off to reduce wear on the parts and to facilitate handling of the hose and opening and closing of the hose valve.

Another object of this invention is to provide a pumping system in accordance with the foregoing object and having an improved arrangement for controlling the speed of operation of the pump to reduce the pump speed when the load on the pump is reduced.

A more particular object of this invention is to provide an improved unloading relief valve for by-passing the discharge of a pump, in which movement of the valve to its by-pass position is initially controlled by the discharge pressure of the pump so as to delay opening of the by-pass until the pump pressure reaches a preselected maximum value, and in which opening of the valve is thereafter controlled by the rate of flow through the by-pass so as to fully open the by-pass when the pump delivery line is cut off and thereby reduce the pressure at the pump outlet under these conditions.

These, together with various ancillary objects and advantages of this invention will be more readily appreciated as the same becomes better understood by reference to the following detailed description when taken in connection with the accompanying drawings wherein.

Figure 1:
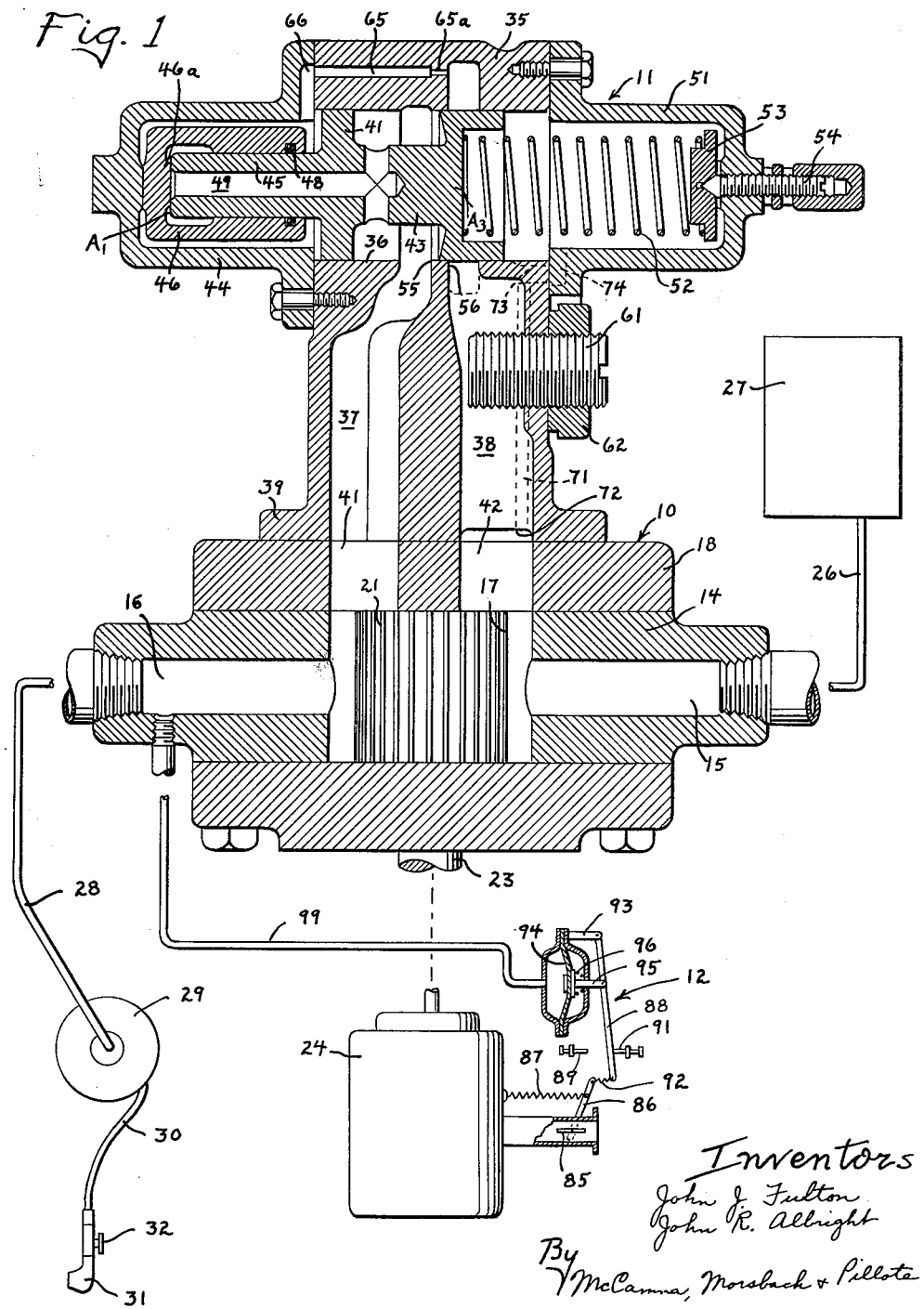
FIGURE 1 is a diagrammatic view of a pumping system embodying the present invention and with the pump and unloading relief valve shown in section.

In pumping systems employing conventional relief valves to by-pass the excess pump discharge, the relief valve does not begin to open until the system pressure builds up to a preset pressure somewhat above normal operating pressure, and does not fully open to by-pass the entire pump discharge until the pressure rises to a value above the preset pressure. Consequently, when the normal pump discharge is cut off and the entire output of the pump is by-passed through the relief valve back to the reservoir, the pump must operate against a pressure appreciably higher than the normal operating pressure in the system. This causes excess wear on the pump associated parts and heating of the fluid being pumped. Further, when such conventional relief valves are used on pumping systems employing flexible hoses such as fuel delivery trucks, fire trucks and the like, the high pressure in the system makes the hose very rigid and difficult to handle, and also makes gradual opening and closing of the delivery nozzle very difficult.

The pumping systems of the present invention is particularly adapted for use in those installations having flexible hoses such as in fuel delivery trucks, fire trucks and the like to reduce the pressure in the hose when the hose nozzle is shut off and thereby facilitate handling of the hose and opening of the hose nozzle, as well as reduction the wear of the parts. It is to be understood, however, that the improved unloading relief valve of the present invention is also generally adapted for use to control the by-passing of fluid around a pump.

The pumping system in general includes a pump 10, an unloading relief valve 11 and a pump drive and speed control apparatus 12. The pump may be any conventional positive displacemnet pump and is herein shown as a gear pump having a casing 14 formed with an inlet 15 and an outlet 16. The casing has a pump chamber 17 and end plates 18 and 19 attached to opposite sides thereof and overlying the ends of the pump chamber. Intermeshing gears 21 are disposed in the pump chamber and a drive shaft 23 is connected to one of the gears and to an internal combustion engine 24 which drives the gears. The inlet 15 of the pump is connected through a conduit 26 to a reservoir 27 containing the liquid to be pumped. The apparatus herein shown is specifically applied to a liquid delivery system for use on fuel trucks and the like and includes a delivery line 28 which is connected to a hose reel 29. The flexible hose 30 is wound on the reel and has a nozzle 31 and a control valve 32 at its outer end for controlling the flow through the delivery line and nozzle.

The unloading relief valve 11 is herein shown mounted directly on the pump 10 and includes a casing 35 defining a valve chamber 36 and inlet and outlet passages 37 and 38 respectively communicating with the valve chamber. The casing is formed with a flange 39 which is bolted or otherwise secured to the end plate 18 of the pump, and the inlet and outlet passages 38 and 39 respectively communicate through ports 41 and 42 in the end plate with the outlet and inlet passages of the pump 10. The valve 11 also includes a spool which is slidable in the valve chamber 36 and has first and second piston elements or bosses 41 and 42 respectively which are interconnected by a stem 43. A cap 44 is attached to one end of the casing and overlies the end of the valve chamber 36. A plunger 45 is formed on one end of the valve member and extends into the casing 44. A cup 46 is loosely disposed in the casing and slidably receives the end of the plunger 45, an O-ring 48 being provided to seal the interface between the cup 46 and plunger 45. The cup 46 is adapted to abut against the cap 44 to limit outward movement of the former and has a boss 46a thereon adapted to engage the end of the plunger to limit movement of the valve member to its closed position shown in FIG. 1. As will be noted, the cup member 46 segregates the area designated A1 on the end of the plunger 45 from the remaining area designated A2 on the end of the piston 41. A second cap 51 is attached to the valve casing 35 and overlies the other end of the valve bore 36. A spring 52 is disposed in the second cap 51 between the piston 42 on the valve mamber and the head 53 to yieldably urge the valve member toward its closed position. An ajusting screw 54 is threaded into the cap 51 and engages the head to enable adjustment of the spring pressure applied to the valve member and hence adjustment of the pressure at which the relief valve will open.

The inlet passage 37 of the relief valve communicates with the valve chamber in an annular port 55 located between the bosses 41 and 42 and the outlet passage 38 communicates with the valve chamber in an annular port 56 spaced axially from the port 55. When the relief valve is in its closed position shown in FIG. 1, the boss 42 overlies the port 56 leading to the outlet passage 38 of the valve to thereby block flow through the bypass back to the inlet of the pump. The relief valve is arranged to open when the pump delivery pressure reaches a preselected maximum value and for this purpose the pressure at the outlet of the pump is applied to the area A1 on the end of the plunger 45. This is conveniently effected by forming a transverse passage 58 in the valve member between the bosses 41 and 42, and an axial passage 49 which connects the transverse passage with the end A1 of the plunger 45. Since the pump delivery pressure is continuously supplied through the valve inlet passage 37 to the valve chamber 36 between the bosses on the valve member, it is apparent that the delivery pressure is continuously applied to the area A1 on the end of the plunger 45. This area is correlated with the spring pressure of spring 52 so as to move the valve member to a position in which the boss 42 just begins to uncover the port leading to the valve outlet passage 38, when the pump delivery pressure reaches the desired maximum value. In accordance with standard practice, this maximum pressure is selected so as to provide the desired rate of flow through the hose 30 and nozzle 31. Since the fluid losses in the hose and fittings will vary dependent on the size and length of the hose, the maximum pressure at which the relief valve will open must be adjusted for each installation.

In the conventional relief valve, the valve member will begin to open the by-pass when the pump reaches a preselected value and the valve member will not move to its fully open position to dump the full pump discharge until the pressure has raised to a relatively higher value. This high pressure causes excessive wear on the pump and associated parts and makes the hose very rigid and difficult to handle. The high pressure existing in the system when the hose valve is closed also makes the hose valve difficult to open and, when the hose valve is opened, it usually opens with a rapid action due to the relieving of pressure on the valve and prevents accurate control of the rate of flow from the nozzle. In order to overcome the aforementioned difficulties, provision is made for rapidly opening the relief valve after the valve has been initially opened by the rise in pump discharge pressure to the preset pressure, to thereby by-pass the pump discharge and reduce the pressure at the discharge side of the pump during by-passing. This is achieved by producing a pressure drop correlative with the rate of flow through the by-pass and applying this pressure to the area A2 on the spool valve. For this purpose, a flow restricting device 61, herein shown in the form of a threaded plug which extends into the outlet passage 38 at a point intermediate the valve chamber 36 and the pump inlet, is provided to produce a pressure drop thereacross correlative with the rate of flow of fluid through the by-pass passage. The plug is adjustable to vary the restriction in the outlet passage 38 and is adapted to be locked in adjusted position by a lock nut 62. The outlet passage 38 of the valve is in open communication with an annular port 56 and the pressure at the upstream side of the flow restricting plug 61 is communicated through a passage 65 in the valve casing 35 and through a radial passage 66 in the end cap 44, with the area A2 on the spool valve. A restriction 65a is preferably formed in the passage 65 to prevent rapid changes of pressure at the area A2. The other end of the spool valve, designated area A3 is communicated to a source of low pressure such as the inlet of the pump or the reservoir, through a passage 71. The passage 71 herein shown is formed in the valve casing 35 and extends alongside the outlet passage 38. The passage 71 communicates at one end 72 with the outlet passage 38 of the valve, and at the other end through lateral passages 73 and 74 with the interior of the end cap 51.

Figure 3:
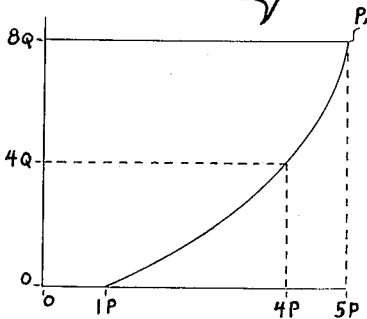
FIG. 3 is a graph illustrating the relation between the pumping system flow rate and the system pressure.

The operation of the relief valve will be best understood from the graph in FIG. 3 illustrating the rate of flow and pressure conditions in a typical system. The normal pump operating pressure is that pressure which the pump must develop to force its full rate of flow (designated 8Q in FIG. 3) through the delivery line and deliver the liquid at the desired pressure at the end of the line. The relief valve is set to open at a pressure designated $P_r$ which is somewhat above normal pump operating pressure so as to remain closed when the delivery nozzle valve 32 is fully open. As the nozzle valve is gradually closed, it increases the back pressure in the delivery line until the pressure at the outlet of the pump acting on the area A, reaches the value $P_r$ and is sufficient to move the valve spool against the spring 52 and just open the port 56. The liquid which flows through the relief valve produces a pressure drop across the restrictor 61 correlative with the rate of flow through the by-pass and this pressure differential is applied between areas A2 and A3 on the spool to aid in moving the valve member to its open position. If the delivery valve is stopped in a partially closed position so that, for example, the rate of flow from the nozzle is only 4Q, only part of the pump discharge is by-passed. Under these conditions, the pressure drop across the flow restrictor 61 will be sufficient, when applied to the area A2, to only partially open the relief valve so that the pump discharge pressure will drop to an intermediate value designated 4P. However, when the delivery valve 32 is completely closed, the fuel pump discharge is by-passed through the relief valve and this produces a relatively high pressure drop across the flow restrictor 61 sufficient to fully open the relief valve. Under the last-mentioned conditions the pump delivery pressure will drop to a very low value designated 1P, determined primarily by the pressure drop across the flow restrictor 61. Preferably, the area A2 is made large as compared to the area A1 so as to minimize the pressure drop across the flow restrictor required to fully open the relief valve and thereby minimize the pump operating pressure when the nozzle valve is closed.

When the positive displacement pump is driven by a prime mover such as an internal combustion engine, which varies in speed in accordance with the load applied thereto, the engine tends to over-speed when the relief valve opens and reduces the pressure at the outlet of the pump. As the engine speed increases, it tends to increase the outlet pressure at the pump. In order to prevent this undesired increase in outlet pressure, due to unloading of the pump by the relief valve, provision is made for controlling the speed of the pump in accordance with the outlet pressure to reduce the speed of the motor when the pump is unloaded. In an internal combustion engine, this can conveniently be effected by providing a control for the throttle 85 of the engine. The control diagrammatically shown herein includes an arm 86 connected to the throttle and normally urged by a spring 87 to a position closing the throttle. The throttle arm 86 is operated by means of a lever 88 which is movable between an idle stop 89 and a high speed stop 91. The lever 88 is connected through a linkage 92 with the throttle control arm 86 and as shown is pivotally attached at its other end to a bracket 93. A pressure responsive device including a diaphragm 94 is connected through a link 95 with the lever 88 and is yieldably urged by a spring 96 to a position against the idle stop. The underside of the diaphragm is connected through a tube 99 with the outlet of the pump 10 so as to apply pressure to the diaphragm correlative with the pump discharge pressure. The spring 96 is correlated with the pump discharge pressure so as to maintain the lever 88 against the idle stop 89 when the pump discharge pressure is reduced to the low value which occurs when the relief valve 11 is fully open. However, when the pump discharge pressure builds up to normal operating pressure, it operates the arm 88 to open the throttle 85 and increase the engine speed. In this manner, the speed of the engine will be made sufficient to provide rapid delivery, and will automatically be reduced when the load on the pump is reduced, to not only further reduce the pump outlet pressure but to also reduce the wear on the pump and engine.

Figure 2:
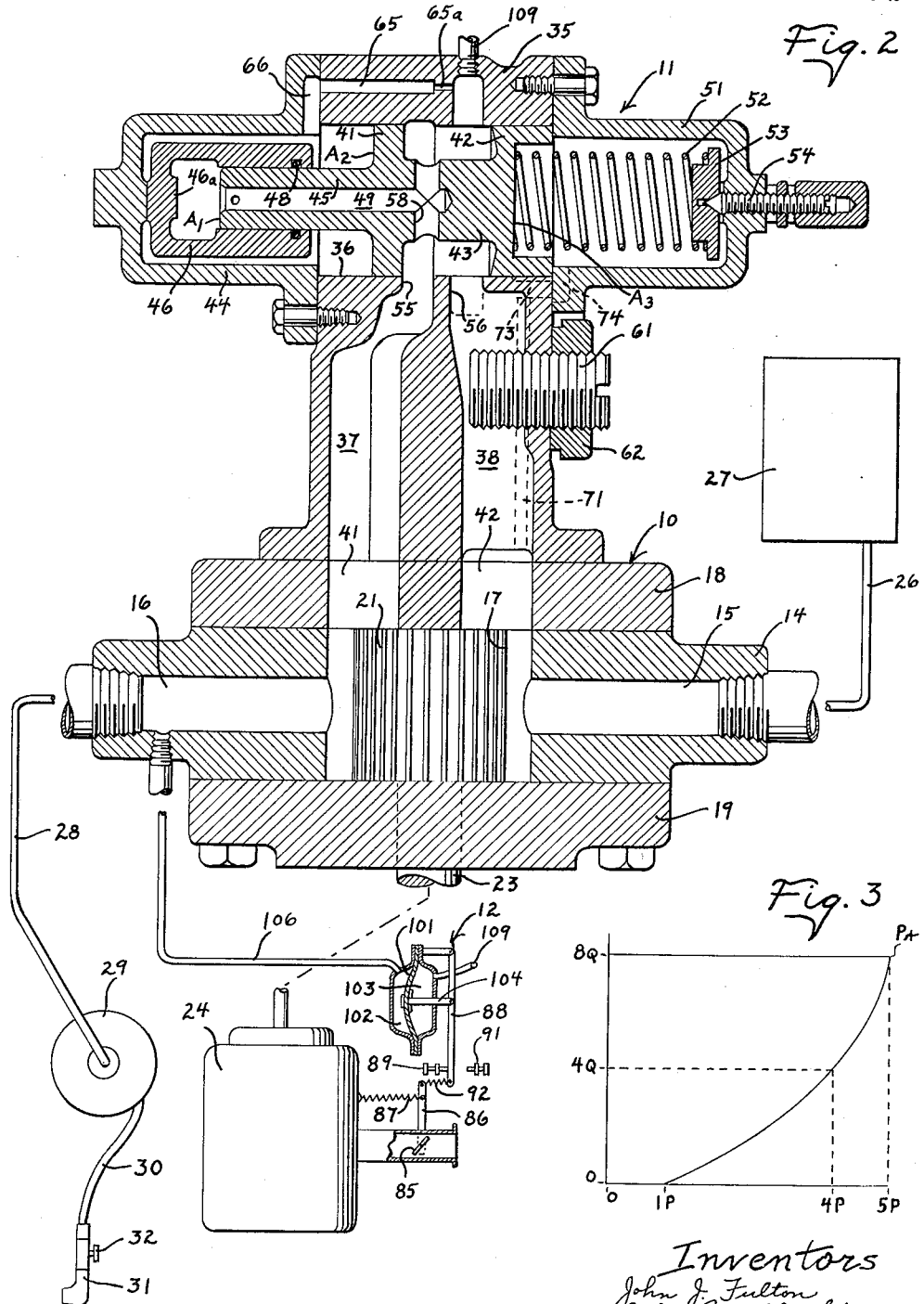
FIG. 2 is a diagrammatic view of a modified form of pumping system with the pump and unloading relief valve shown in section.

The above system for controlling the throttle of the engine employs a single tube 99 and is advantageous in those installations wherein the pump is remote from the internal combustion engine. However, this system requires careful adjustment of the springs 87 and 96 to effect proper control of the throttle 85 in accordance with the outlet pressure of the pump. In order to overcome this difficulty, a modified control system employing two tubes is shown in FIG. 2. In this embodiment, the spring 96 is omitted. The fluid pressure responsive device includes a diaphragm 101 and a casing defining opposed chambers 102 and 103 at opposite sides of the diaphragm. The diaphragm is connected to a link 104 to the lever 88. Fluid pressure correlative with the pressure in the delivery line 28 is supplied through a tube 106 to the underside of the diaphragm. Fluid pressure correlative with the rate of flow through the by-pass is supplied from a conduit 109 which extends between the valve port 56 at the upstream side of the flow restrictor 61, and the upper chamber 103 of the pressure responsive device. Thus, when the relief valve is in its closed position, the pressure at the upstream side of the flow restrictor 61 is at a relatively low value, that is substantially inlet pressure, so that the pump discharge pressure acting on the underside of the diaphragm will move the diaphragm to a raised position and open the throttle to increase the engine speed. However, when the nozzle valve 32 is closed and the by-pass valve opened, the pressures on opposite sides of the diaphragm will be substantially equalized so that the throttle arm will be moved to close the throttle, under the bias of spring 87. With this arrangement, it is unnecessary to independently adjust the springs for each installation.

We claim:

1. An unloading relief valve defining a valve chamber having inlet and outlet passages communicating therewith, a spool valve member in said chamber having first and second bosses connected by a stem, said inlet passage communicating with said valve chamber between the inner ends of said bosses, means yieldably urging said spool member to a closed position in which said second boss overlies said outlet to block flow thereto, a plunger connected to the outer end of said first boss, means slidably engaging said plunger to separate the area at the end of said plunger from the remaining area on said outer end of said first boss, a first passage means for applying fluid pressure from said inlet passage to the area on the end of said plunger, a flow restricting device in said outlet passage for producing a pressure drop thereacross correlative with the rate of flow of fluid from said inlet to said outlet, a second passage means communicating with said outlet passage upstream of said restricting device for applying the pressure thereat to the remaining area at said outer end of said first boss, and a third passage means communicating with the outlet passage downstream of said restricting device for applying the pressure thereat to the outer end of said second boss.

2. An unloading relief valve defining a valve chamber having inlet and outlet passages communicating therewith, a spool valve member in said chamber having first and second bosses connected by a stem, said inlet passage communicating with said valve chamber between the inner ends of said bosses, means yieldably urging said spool member to a closed position in which said second boss overlies said outlet to block flow thereto, a plunger connected to the outer end of said first boss, a cup loosely disposed in said chamber slidably engaging said plunger to separate the area at the end of said plunger from the remaining area on the outer end of said first boss, a first passage means in said spool member extending from a point between the inner ends of said bosses to the end of said plunger for applying pressure from the inlet passage to the end of said plunger, a flow restricting device in said outlet passage for producing a pressure drop thereacross correlative with the rate of flow of fluid through said second passage, a second passage means communicating with said outlet passage at the upstream side of said restricting device for applying the pressure thereat to the outer side of said first boss, and a third passage means communicating with the outlet passage at the downstream side of said restricting device for applying the pressure thereat to the outer side of said second boss.

3. A fluid pumping system comprising, a supply source, a delivery line, a pump having an intake side connected to said source and a discharge side connected to said delivery line for pumping fluid from said source to said delivery line, a flow control nozzle at the outlet end of said delivery line remote from said pump, an unloading relief valve including a passage having an inlet connected to the discharge side of said pump and an inlet connected to the intake side of said pump, said relief valve having a valve member movable between a closed position blocking flow from said inlet to said outlet and an open position, means yieldably urging said valve member to its closed position, means defining first and second pressure areas on said valve member facing in the direction of movement of the valve member to its closed position, means for applying pressure from said inlet to said first area to move the valve member to its open position when the pressure at said inlet reaches a preselected value, means defining a flow restrictor in said passage between said valve member and said outlet for producing a pressure drop thereacross correlative with the rate of flow through said passage, and passage means communicating with said passage between the valve member and said flow restricting means for applying the pressure thereat to said second area to aid in moving the valve member to its open position when fluid begins to flow through said passage.

4. The combination of claim 3 wherein said second area is large as compared to said first area.

5. A fluid pumping system comprising, a supply source, a delivery line, a pump having an intake side connected to said source and a discharge side connected to said delivery line for pumping fluid from the source to said delivery line, a flow control nozzle at the outlet end of said delivery line remote from said pump, an unloading relief valve including a passage having an inlet connected to the discharge side of the pump and an outlet connected to the intake side of the pump, a valve member in said relief valve movable between a closed position blocking flow from said inlet to said outlet and an open position, means yieldably urging said valve member to its closed position, means defining first and second pressure areas on said valve member disposed transverse to the path of movement of the valve member and segregated from each other, means for applying pressure from said inlet to said first area to move the valve member to its open position when the pressure at the inlet reaches a preselected value, means for producing a control pressure correlative in magnitude with the rate of flow of liquid through said passage, means for applying said control pressure to said second area to aid in moving said valve member to its open position when fluid begins to flow through said by-pass passage, an engine connected to said pump to drive the same and having a speed control throttle, a double acting pressure responsive device operatively connected to said throttle for moving the same between an open and an idle position, means for applying pressure from the outlet of the pump to one side of the pressure responsive device, and means for applying said control pressure to the other side of the pressure responsive device to move the throttle to an idling position when flow through the delivery line is cut off and full pump discharge passes through said relief valve.

6. A fluid pumping system comprising, a supply source, a delivery line, a pump having an intake side connected to said source and a discharge side connected to said delivery line for pumping fluid from said source to said delivery line, a flow control nozzle at the outlet end of said delivery line remote from said pump, an unloading relief valve including a passage having an inlet connected to the discharge side of said pump and an outlet connected to the intake side of said pump, said relief valve having a valve member movable between a closed position blocking flow from said inlet to said outlet and an open position, means yieldably urging said valve member to its closed position, means defining first and second pressure areas on said valve member facing in the direction of movement of the valve member to its closed position, means for applying pressure from said inlet to said first area to move the valve member to its open position when the pressure at said inlet reaches a preselected value, means defining a flow restrictor in said passage between said valve member and said outlet for producing a pressure drop thereacross correlative with the rate of flow through said passage, passage means communicating with said passage between the valve member and said flow restricting means for applying the pressure thereat to said second area to aid in moving the valve member to its open position when fluid begins to flow through said passage, an engine operatively connected to said pump to drive the same and having a speed control throttle, a double acting pressure responsive device operatively connected to said throttle for moving the same between an open and an idle position, means for applying pressure from the outlet of said pump to one side of the pressure responsive device, and means communicating with said by-pass between said valve member and said flow restricting means for applying pressure to the other side of the pressure responsive device to move the throttle to an idling position when flow through the delivery line is shut off.

7. An unloading relief valve for use in a pumping system, said relief valve including a passage having an inlet adapted for connection to the discharge side of a pump and an outlet adapted for connection to the suction side of a pump, said relief valve having a valve seat intermediate said inlet and said outlet, a valve member movable relative to said seat between a position closing said seat and blocking flow from said inlet to said outlet and an open position away from said seat, means yieldably urging said valve member in one direction toward said seat to normally block flow through said passage, means defining first and second pressure areas on said valve member disposed transverse to its path of movement and segregated from each other, said first and second pressure areas both facing in said one direction and being operative when pressure is applied thereto to urge said valve member in the other direction toward its open position, means for applying pressure from said inlet to said first area to move the valve member to its open position when the pressure at the inlet reaches a preselected value, flow restrictor means in said passage between said seat and said outlet for producing a control pressure in said passage between said seat and said flow restrictor that increases in magnitude correlative with the rate of flow of fluid through said passage, passage means communicating with said passage between said seat and said flow restrictor and with said second area for applying said control pressure to said second area to aid in moving said valve member to its open position when fluid begins to flow through said passage with a force that increases and decreases as the flow through said passage respectively increases and decreases.

8. The combination of claim 7 wherein said flow restrictor is adjustable.

9. An unloading relief valve for use in a pumping system, said relief valve including a passage having an inlet adapted for connection to the discharge side of a pump and an outlet adapted for connection to the suction side of a pump, said relief valve having a valve seat intermediate said inlet and said outlet, a valve member movable relative to said seat between a position closing said seat and blocking flow from said inlet to said outlet and an open position away from said seat, means yieldably urging said valve member in one direction toward said seat to normally block flow through said passage, means defining a first pressure area on said valve member facing in said one direction and operative when fluid pressure is applied thereto to urge said valve member in the other direction toward its open position, means continuously communicating said inlet with said first area for applying fluid pressure from said inlet to said first area to move said valve member to its open position when the pressure at the inlet reaches a preselected value, means defining a second and a third pressure area on said valve member respectively facing in said one direction and said other direction, said second pressure area being operative when fluid pressure is applied thereto to urge said valve member in said other direction toward its open position, said third pressure area being operative when fluid pressure is applied thereto to urge said valve member in said one direction toward its closed position, flow restrictor means in said passage between said seat and said outlet for producing a pressure differential thereacross that increases in magnitude correlative with the rate of flow of fluid through said passage, and means for applying said pressure differential to said valve member, said last mentioned means including a second passage means communicating with said passage between said seat and said flow restrictor and with said second pressure area for applying the pressure in said passage at the inlet side of the flow restrictor to said second area, and a third passage means communicating with said passage between said flow restrictor and said outlet and with said third pressure area for applying the pressure in said passage at the outlet side of the flow restrictor to said third area.

References Cited in the file of this patent

UNITED STATES PATENTS

| 75,392 | Dougherty | Mar. 10, 1868 |
|---|---|---|
| 1,103,053 | Kiefer | July 14, 1914 |
| 1,164,990 | Cockburn et al. | Dec. 21, 1915 |
| 1,972,435 | Ackermann | Sept. 4, 1934 |
| 2,080,824 | Kane | May 18, 1937 |
| 2,406,973 | Trisler | Sept. 3, 1946 |
| 2,456,651 | Schmiel | Dec. 21, 1948 |
| 2,609,755 | Griswold | Sept. 9, 1952 |
| 2,625,108 | Logan | Jan. 13, 1953 |
| 2,633,188 | Schorn et al. | Mar. 31, 1953 |
| 2,651,263 | Mathews | Sept. 8, 1953 |
| 2,683,418 | Smith | July 13, 1954 |
| 2,752,858 | Berges | July 3, 1956 |
| 2,958,291 | Rittenhouse | Nov. 1, 1960 |

FOREIGN PATENTS

| 567,246 | Great Britain | Feb. 5, 1945 |